United States Patent
Rodrigues et al.

(10) Patent No.: US 11,400,413 B2
(45) Date of Patent: Aug. 2, 2022

(54) METHOD AND FACILITY FOR PURIFYING A FEED GAS STREAM COMPRISING AT LEAST 90% CO2

(71) Applicant: L'Air Liquide, Société Anonyme pour l'Etude et l'Exploitation des Procédés Georges Claude, Paris (FR)

(72) Inventors: Guillaume Rodrigues, Le Plessis Trevise (FR); Philippe Arpentinier, Le Perray en Yvelines (FR); Aurélien Franco, Paris (FR); Rémi Jabes, Champigny-sur-Marne (FR); François Lagoutte, Saint-Egréve (FR); Laurent Perru, Paris (FR); Etienne Werlen, Versailles (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 318 days.

(21) Appl. No.: 16/637,978

(22) PCT Filed: Jul. 13, 2018

(86) PCT No.: PCT/FR2018/051788
§ 371 (c)(1),
(2) Date: Feb. 10, 2020

(87) PCT Pub. No.: WO2019/030437
PCT Pub. Date: Feb. 14, 2019

(65) Prior Publication Data
US 2020/0206686 A1    Jul. 2, 2020

(30) Foreign Application Priority Data
Aug. 10, 2017 (FR) .................. FR1757639

(51) Int. Cl.
*B01D 53/86* (2006.01)
*B01D 53/00* (2006.01)

(52) U.S. Cl.
CPC ....... *B01D 53/8687* (2013.01); *B01D 53/002* (2013.01); *B01D 53/8681* (2013.01); *B01D 2256/22* (2013.01); *B01D 2257/2045* (2013.01); *B01D 2257/2047* (2013.01); *B01D 2257/302* (2013.01); *B01D 2257/404* (2013.01); *B01D 2259/416* (2013.01)

(58) Field of Classification Search
CPC ............ B01D 53/8662; B01D 53/8681; B01D 2255/1021; B01D 53/002; B01D 2257/302; B01D 2257/2047; B01D 53/8687; B01D 2259/416; B01D 2256/22; B01D 2255/1023; B01D 2257/404; B01D 2257/2045; B01D 53/50; B01D 53/68; B01D 53/56; Y02C 20/30; C01B 32/50
See application file for complete search history.

(56) References Cited

U.S. PATENT DOCUMENTS

| | | | | |
|---|---|---|---|---|
| 5,321,946 | A * | 6/1994 | Abdelmalek | C10J 3/54 60/648 |
| 7,871,593 | B2 * | 1/2011 | Erkes | B01J 8/0496 423/532 |
| 8,580,206 | B2 * | 11/2013 | Allam | C01B 32/50 422/168 |
| 9,458,022 | B2 * | 10/2016 | Beasse | B01D 19/0031 |
| 2012/0009106 | A1 | 1/2012 | Petrocelli et al. | |
| 2013/0224808 | A1 | 8/2013 | Bell et al. | |
| 2013/0319040 | A1 | 12/2013 | Naito | |
| 2014/0260966 | A1 * | 9/2014 | Dillon | B01D 53/83 95/20 |
| 2016/0067651 | A1 | 3/2016 | Naito | |
| 2022/0040630 | A1 * | 2/2022 | Guillou | B01D 53/1493 |

FOREIGN PATENT DOCUMENTS

| | | |
|---|---|---|
| CN | 101607708 | 12/2009 |
| DE | 43 05 386 | 8/1994 |
| DE | 11 2011 104855 | 11/2013 |
| EP | 1 084 744 | 3/2001 |
| JP | 2010 172878 | 8/2010 |
| RU | 2013 126201 | 12/2014 |

OTHER PUBLICATIONS

International Search Report and Written Opinion for corresponding PCT/FR2018/030437, dated Oct. 18, 2018.

* cited by examiner

*Primary Examiner* — Timothy C Vanoy
(74) *Attorney, Agent, or Firm* — Elwood L. Haynes

(57) ABSTRACT

A process for purifying a feed gas stream containing at least 90% of $CO_2$, at least 20% RH and at least one impurity chosen from chlorinated, sulfur-bearing, nitrated or fluorinated compounds is provided. The process includes a) subjecting the feed gas stream to catalytic oxidation producing a stream containing at least one of HCl, NOx, SOx or hydrofluoric acid; b) maintaining the temperature of the gas stream above the highest value between the dew points of water and the acid(s) contained in the gas; c) removing at least a part of the acid impurities by bringing the gas stream into contact with a corrosion-resistant heat exchanger to condense the acid compounds while regulating the temperature of the gas stream exiting below the dew point of water; and d) separating the acid condensates with a corrosion-resistant separator in such a way as to produce a $CO_2$-enriched gas stream.

12 Claims, No Drawings

METHOD AND FACILITY FOR PURIFYING A FEED GAS STREAM COMPRISING AT LEAST 90% CO2

CROSS REFERENCE TO RELATED APPLICATIONS

This application is a 371 of International PCT Application PCT/FR2018/030437, filed Jul. 13, 2018, which claims priority to French Patent Application 1757639, filed Aug. 10, 2017, the entire contents of which are incorporated herein by reference.

BACKGROUND

The present invention relates to a process and a facility for purifying a feed gas stream comprising at least 90% of $CO_2$, preferably 95% of $CO_2$.

Carbon dioxide is used in various applications, for example for the food market, which requires that the $CO_2$ contains very low levels of impurities. By way of example, is the ISBT (International Society of Beverage Technologists) standard requires that the composition below be complied with:
Purity: 99.9% v/v min,
Moisture content: 20 ppm v/v max.
Oxygen: 30 ppm v/v max.
Carbon monoxide: 10 ppm v/v max.
Ammonia: 2.5 ppm v/v max.
Nitric oxide/Nitrogen dioxide: 2.5 ppm v/v max. (each)
Nonvolatile residue: 10 ppm w/w max.
Nonvolatile organic residue: 5 ppm w/w max.
Phosphine: 0.3 ppm v/v max.
Total volatile hydrocarbons: (such as methane) 50 ppm v/v max. with 20 ppm v/v max. for total non-methane hydrocarbons
Acetaldehyde: 0.2 ppm v/v max.
Aromatic hydrocarbon content: 20 ppm v/v max.
Total sulfur content*(S): (*Total impurities containing sulfur, except sulfur dioxide) 0.1 ppm v/v max.
Sulfur dioxide: 1 ppm v/v max.

The $CO_2$-rich feed stream can come from different sources, such as ammonia plants, natural wells, biofermentation, synthesis gas production units, etc. . . . containing various traces of impurities, including hydrocarbons, sulfur-bearing compounds, nitrous compounds, chlorinated compounds and many other impurities which must be efficiently and economically removed.

Currently, various technologies are used alone or in combination to remove these impurities from the $CO_2$-rich feed stream:
absorption: washing with water, washing with $CO_2$ (physical absorption) or other types of purifiers based on chemical reactions (chemical absorption),
adsorption: regenerative systems such as PSA (pressure swing adsorption=adsorption with pressure variation), TSA (temperature swing adsorption=adsorption with temperature variation), or a combination of PSA and TSA; or non-regenerable systems such as impregnated activated carbon,
catalytic oxidation (Catox): tolerant or non-tolerant to sulfur, hydrocarbons and other species in the presence of excess air are completely oxidized at a temperature above 350° C. using selected catalysts.

Among the absorption technologies, the wet separator is a frequent solution which can be adapted to high contents of impurities. It consists in passing the feed gas through a medium promoting fluidic contact, for example a structured or random packaging, inside a container. Water is sprayed or dispensed on the top of the container. While this solution appears to be efficient in removing oxygen-containing water-soluble hydrocarbon compounds such as, for example, ethanol and methanol from feed streams, it is not efficient in removing hydrocarbons that are water-insoluble, the water-solubility of which is very low. Another disadvantage is that water has to be introduced into the system. For the food-grade $CO_2$ production field, this water must consume potable water. Such water may not be available or may be available at high cost in an industrial plant.

Alternatively, the basic anions of the hydroxyl group, of carbonate or of bicarbonate are introduced in a (ground) solid form or a liquid form into the feed gas. The basic anions react with acid gases to form salts. The salts are then filtered off in a bag filter or separated in a container. The disadvantage of this solution is that it is not referenced for high efficiency removal. Its conventional application is the treatment of combustion gases, in order to comply with environmental standards. These standards are much less demanding than those applied for food $CO_2$. As with the water purifier, this solution involves the addition of an external component.

Handling chemical reagents such as sodium hydroxide requires special care and additional equipment (storage, metering system). For example, the use of sodium bicarbonate leads to strong constraints. Indeed, this solution must be used at a temperature of between 140° C. and 300° C.

Adsorption beds can be based on physical adsorption. The weak adsorption force implies easy regeneration, but also fairly weak or moderate adsorption capacities. Thus, on the one hand, it allows a regenerative process, having a long lifetime; on the other hand, it may require high amounts of adsorbents detrimental to the cost or very rapid cycle times (time comprising adsorption then the regeneration steps) requiring significant amounts of regeneration gas to be available.

For the management of the impurities in question, physical adsorption is often combined with chemical adsorption. It consists in using "dead" charges of impregnated adsorbents which react chemically with impurities. Since the regeneration of these adsorbents is often not economical on site, when the bed is saturated with impurities, the charge is replaced with a new one. By way of example, sulfur-bearing compounds containing $CO_2$ can be brought into contact with a support material (activated carbon, alumina, etc.) impregnated with metal oxides (FeO, ZnO, CuO, etc.). Then, the metal oxides react with sulfur-bearing compounds and create metal sulfides and water vapor.

From there, a problem which arises is that of providing an improved and economical process for purifying a feed gas stream comprising at least 90% of $CO_2$.

SUMMARY

A process for purifying a feed gas stream containing at least 90% of $CO_2$, at least 20% RH and at least one impurity chosen from chlorinated, sulfur-bearing, nitrated or fluorinated compounds is provided. The process includes a) subjecting the feed gas stream to catalytic oxidation producing a stream containing at least one of HCl, NOx, SOx or hydrofluoric acid; b) maintaining the temperature of the gas stream above the highest value between the dew points of water and the acid(s) contained in the gas; c) removing at least a part of the acid impurities by bringing the gas stream into contact with a corrosion-resistant heat exchanger to condense the acid compounds while regulating the temperature of the gas stream exiting below the dew point of water; and d) separating the acid condensates with a corrosion-resistant separator in such a way as to produce a $CO_2$-enriched gas stream.

DETAILED DESCRIPTION OF PREFERRED EMBODIMENTS

A solution of the present invention is a process for purifying a feed gas stream comprising at least 90% of $CO_2$, preferably at least 95% of $CO_2$, at least 20% relative humidity and at least one impurity chosen from chlorinated, sulfur-bearing, nitrated or fluorinated compounds, comprising the following successive steps:

a) a step of subjecting the feed gas stream to catalytic oxidation in such a way as to produce a gas stream comprising at least one acid impurity chosen from HCl, $HNO_3$, NOx, SOx, $H_2SO_4$ and HF;

b) a step of maintaining the temperature of the gas stream from step a) above the highest value between the dew point of water and the dew point of the acid(s) contained in the gas downstream of the catalytic process (the term critical dew point will be used);

c) a step of removing at least a part of the acid impurities by bringing the gas stream from step b) into contact with at least one corrosion-resistant heat exchanger in such a way as to condense the acid compounds while regulating the temperature of the gas stream exiting below the dew point of water; and d) a step of separating the acid compounds from the gas stream from step c) by means of a corrosion-resistant separator in such a way as to produce a $CO_2$-enriched gas stream.

Step b) makes it possible to avoid any creation of acid liquid that would corrode the piping and other standard materials. Care will be taken never to go below the critical dew point via suitable operating conditions but also by virtue of thermal insulation or even an external temperature maintenance system (electric or steam) preventing the creation of cold spots (temperature locally below the critical dew point) on the equipment.

In step c), if the composition of the feed gas for the catalytic process varies, the outlet temperature of the condensation exchanger in indirect contact, of plate or shell-and-tube type, will optionally be regulated via the flow rate of cooling liquid/gas feeding it or by the temperature thereof.

As the case may be, the process according to the invention can exhibit one or more of the following features:
said process comprises, after step d), the following successive steps:
e) a step of liquefying the $CO_2$-enriched gas stream,
f) a step of drying the liquefied stream, and
g) a step of sending the dried stream to a cryogenic unit.
The drying is generally carried out via a reversible adsorption unit which makes it possible to achieve water contents compatible with the cryogenic temperature in question (<10 ppmv and preferentially <1 ppmv),
the heat exchanger and the separator consist of materials chosen from austenitic steel, glass or a composite resistant to nitric, sulfuric or hydrochloric acid,
the catalytic oxidation is carried out by means of a catalytic oxidation unit, the catalyst of which is tolerant to sulfur and to chlorine,
the feed gas stream subjected to catalytic oxidation is at a temperature of at least 300° C., preferably at least 425° C.,
the feed gas stream subjected to catalytic oxidation is at a pressure greater than 1 bar absolute,
the feed gas stream can come from various sources, such as monoethylene glycol manufacturing units or biofermenters,
in step c), water or a water/glycol mixture is preferentially used as a refrigerant within the heat exchanger.

In order to improve the exchange surface while remaining on standard exchanger sizes or in order to carry out condensation at 2 temperature levels, it will be possible to use several exchangers in parallel or in series respectively with a common separator vessel downstream or a separator vessel associated with each of the exchangers.

Preferably, the water heated in the heat exchanger by the gas stream is in a closed circuit and is cooled in a second, ammonia/water heat exchanger.

A subject of the present invention is also a facility for the purification of a feed gas stream comprising at least 95% of $CO_2$, at least 20% relative humidity and at least one impurity chosen from chlorinated, sulfur-bearing, nitrated or fluorinated compounds, comprising, in the direction of circulation of the gas stream:

a) a catalytic oxidation unit making it possible to subject the gas stream to catalytic oxidation in such a way as to produce a gas stream comprising at least one acid impurity chosen from HCl, NOx and SOx;

b) a means for maintaining the temperature of the gas stream exiting the catalytic oxidation unit above the acid dew point;

c) a corrosion-resistant heat exchanger making it possible to condense the acid compounds of the gas stream;

d) a corrosion-resistant separator making it possible to separate the acid compounds from the gas stream in such a way as to produce a $CO_2$-enriched gas stream.

Preferably, in step d), a corrosion-resistant drum separator will be used.

Preferably in step d), the separator is equipped with an automatic emptying system.

Depending on the case, the facility according to the invention may have one or more of the features below:
said facility comprises, downstream of the separator and in the direction of circulation of the $CO_2$-enriched gas stream:
e) a liquefier making it possible to liquefy the $CO_2$-enriched gas stream;
f) a dryer making it possible to dry the liquefied gas; and
g) a cryogenic unit,
the heat exchanger and the separator consist of materials chosen from austenitic steel, glass or a composite resistant to nitric, sulfuric or hydrochloric acid. By way of example, mention will be made of 254SMO and 904L steels, nickel-based alloys or titanium. Preferably, when chlorinated compounds are present in the feed stream, the heat exchanger is made of 254SMO stainless steel for the parts in contact with the process gas, the remainder being made of SS 316L steel, specially designed for strong corrosion created by HCl,
the catalytic oxidation is carried out by means of a catalytic oxidation unit resistant to sulfur and to chlorine.

EXAMPLE

Example: Purification of a Stream Containing Chlorinated Molecules

Stream from a unit for producing monoethylene glycol containing 1 ppmv of chlorinated compounds:

| Name | | Crude gas |
|---|---|---|
| Molar flow | Sm³/h | 4456 |
| Flow by weight | kg/h | 8462 |
| Temperature | ° C. | 39 |
| Pressure | bar a | 1.823 |
| Vapor fraction | | |
| $CO_2$ molar fraction | | 0.933453 |
| Oxygen molar fraction | | 0.000000 |
| Acetaldehyde molar fraction | | 0.000250 |
| Methane molar fraction | | 0.002496 |
| Water molar fraction | | 0.039930 |
| Ethane molar fraction | | 0.000032 |
| i-Butane molar fraction | | 0.000480 |
| Benzene molar fraction | | 0.000029 |
| Ethylene molar fraction | | 0.021506 |
| Carbon dioxide molar fraction | | 0.001823 |
| $ClC_2$ molar fraction | | 0.000001 |
| HCl molar fraction | | 0.000000 |

The stream is brought into contact with a catalytic bed containing a first layer of platinum catalyst and a second layer of palladium catalyst, making it possible to convert most of the hydrocarbons to water and to carbon dioxide. At the outlet of the catalytic reactor, the gas stream at a temperature of greater than 300° C. and containing HCl is cooled to a temperature above the dew point of water (43° C.), in order to prevent condensation.

In practice, a minimum temperature of 55° C., i.e. 12° C. above the theoretical temperature, will be maintained, thus dispensing with measurement inaccuracies and equipment insulation faults.

| Name | | Skid entry |
|---|---|---|
| Molar flow | Sm³/h | 4819 |
| Flow by weight | kg/h | 8999 |
| Temperature | ° C. | 55 |
| Pressure | bar a | 1.19 |
| Vapor fraction | | 1 |
| $CO_2$ molar fraction | | 0.910992 |
| Oxygen molar fraction | | 0.011299 |
| Acetaldehyde molar fraction | | 0.000000 |
| Methane molar fraction | | 0.000036 |
| Molar fraction of $H_2O$ | | 0.077672 |
| Ethane molar fraction | | 0.000000 |
| i-Butane molar fraction | | 0.000000 |
| Benzene molar fraction | | 0.000000 |
| Ethylene molar fraction | | 0.000001 |
| Carbon dioxide molar fraction | | 0.000000 |
| $ClC_2$ molar fraction | | 0.000000 |
| HCl molar fraction | | 0.000001 |

The fluid, at the temperature of 55° C., will then be conveyed in a skid comprising a heat exchanger made of hydrochloric acid-resistant material such as the steel grade 254SMO. The cold will be brought into the exchanger by means of a heat transfer fluid such as water, at a temperature below 43° C., preferentially below 10° C., in order to minimize the size of the exchanger.

| Name | | Cooling water feeding the exchanger |
|---|---|---|
| Molar flow | Sm³/h | 9953 |
| Flow by weight | kg/h | 8000 |
| Temperature | ° C. | 7 |
| Pressure | bar a | 3.95 |
| Vapor fraction | | 0 |

In this example, the condensation of water combined with a substantial exchange surface area alone will ensure the removal of the HCl contained in the gas phase due to the very high solubility of HCl in water (720 g/l at 20° C.)

The separation of the liquid droplets containing the acid molecules will be ensured by a separator vessel (installed directly downstream of the exchanger) made of a material resistant to corrosion by chlorine, such as the steel grade 254 SMO or more simply by a material made of polymer resin.

The process gas at the outlet of the separator vessel and the condensed liquid, discharged at the bottom of the separator vessel will have the following compositions:

| Name | | Separator vessel gas outlet | Separator vessel liquid outlet |
|---|---|---|---|
| Molar flow | Sm³/h | 4688 | 131 |
| Flow by weight | kg/h | 8893 | 106 |
| Temperature | ° C. | 35 | 35 |
| Pressure | bar a | 1.14 | 1.14 |
| Vapor fraction | | 1 | 0 |
| $CO_2$ molar fraction | | 0.936535 | 0.000055 |
| Oxygen molar fraction | | 0.011615 | 0.000000 |
| Acetaldehyde molar fraction | | 0.000000 | 0.000000 |
| Methane molar fraction | | 0.000037 | 0.000000 |
| $H_2O$ molar fraction | | 0.051811 | 0.999942 |
| Frac (Ethane) | | 0.000000 | 0.000000 |
| i-Butane molar fraction | | 0.000000 | 0.000000 |
| Benzene molar fraction | | 0.000000 | 0.000000 |
| Ethylene molar fraction | | 0.000001 | 0.000000 |
| Carbon dioxide molar fraction | | 0.000000 | 0.000000 |
| $ClC_2$ molar fraction | | 0.000000 | 0.000000 |
| HCl molar fraction | | 0.000000 | 0.000003 |

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A process for purifying a feed gas stream comprising at least 90% of $CO_2$ on a dry basis, at least 20% relative humidity and at least one impurity chosen from chlorinated, sulfur-bearing, nitrated or fluorinated compounds, comprising the following successive steps:
   a) subjecting the feed gas stream to catalytic oxidation in such a way as to produce a gas stream comprising at least one acid impurity chosen from HCl, NOx, SOx or hydrofluoric acid;
   b) maintaining the temperature of the gas stream from step a) above the highest value between the dew point of water and the dew point of the acid(s) contained in the gas downstream of the catalytic process;
   c) removing at least a part of the acid impurities by bringing the gas stream from step b) into contact with at least one corrosion-resistant heat exchanger in such a way as to condense the acid compounds while regulating the temperature of the gas stream exiting below the dew point of water; and
   d) separating the acid condensates from the gas stream from step c) by means of a corrosion-resistant separator in such a way as to produce a $CO_2$-enriched gas stream.

2. The process as claimed in claim 1, further comprising, after step d), the following successive steps:
   e) liquefying the $CO_2$-enriched gas stream,
   f) drying the liquefied stream, and
   g) sending the dried stream to a cryogenic unit.

3. The process as claimed in claim 1, wherein the heat exchanger and the separator comprise materials chosen from austenitic steel, glass or a composite resistant to nitric, sulfuric or hydrochloric acid.

4. The process as claimed in claim 1, wherein the catalytic oxidation is carried out by means of a catalytic oxidation unit resistant to sulfur and to chlorine.

5. The process as claimed in claim 1, wherein the feed gas stream subjected to the catalytic oxidation is at a temperature of at least 300° C.

6. The process as claimed in claim 1, wherein the feed gas stream subjected to the catalytic oxidation is at a pressure of at least 1 bar absolute.

7. The process as claimed in claim 1, wherein the feed gas stream comes from a monoethylene glycol unit, from washing of $CO_2$ by absorption, from a monoethylene glycol synthesis unit, from a biofermentation or any other process generating a $CO_2$-rich stream.

8. The process as claimed in claim 1, wherein, in step c), water is used as refrigerant within the heat exchanger.

9. A facility for the purification of a feed gas stream comprising at least 95% of $CO_2$, at least 20% relative humidity and at least one impurity chosen from chlorinated, sulfur-bearing, nitrated or fluorinated compounds, comprising, in the direction of circulation of the gas stream:
  a) a catalytic oxidation unit configured to subject the gas stream to catalytic oxidation in such a way as to produce a gas stream comprising at least one acid impurity chosen from HCl, NOx and SOx;
  b) a means for maintaining the temperature of the gas stream exiting the catalytic oxidation unit above the acid dew point;
  c) a corrosion-resistant heat exchanger making it possible to condense the acid compounds of the gas stream; and
  d) a corrosion-resistant separator making it possible to separate the acid compounds from the gas stream in such a way as to produce a $CO_2$-enriched gas stream.

10. The facility as claimed in claim 9, wherein said facility comprises, downstream of the separator and in the direction of circulation of the $CO_2$-enriched gas stream:
  e) a liquefier making it possible to liquefy the $CO_2$-enriched gas stream;
  f) a dryer making it possible to dry the liquefied gas; and
  g) a cryogenic unit.

11. The facility as claimed in claim 9, wherein the heat exchanger and the separator comprise materials chosen from austenitic steel, glass or a composite resistant to nitric, sulfuric or hydrochloric acid.

12. The facility as claimed in claim 9, wherein the catalytic oxidation is carried out by means of a catalytic oxidation unit resistant to sulfur and to chlorine.

* * * * *